April 21, 1964   C. E. SINDLINGER   3,129,476
SPRING CLIP FOR GROUND GLASS TUBING JOINTS
Filed April 12, 1962
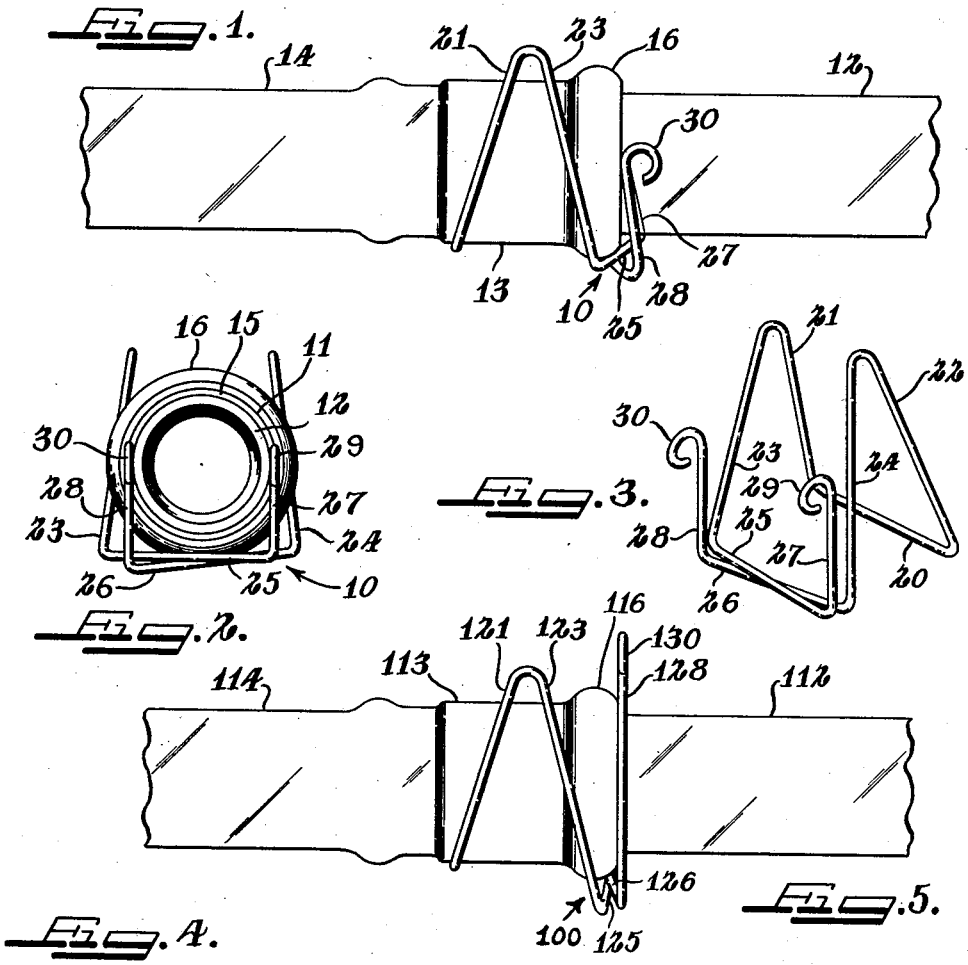
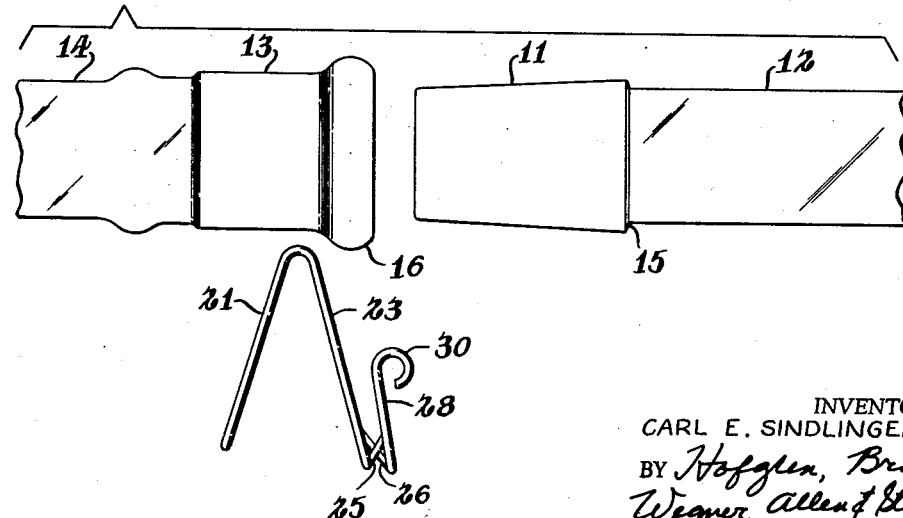
INVENTOR.
CARL E. SINDLINGER
BY Hofgren, Brady,
Wegner, Allen & Stellman
Attys.

United States Patent Office 3,129,476
Patented Apr. 21, 1964

3,129,476
SPRING CLIP FOR GROUND GLASS
TUBING JOINTS
Carl E. Sindlinger, Pagedale, Mo., assignor to Brunswick
Corporation, a corporation of Delaware
Filed Apr. 12, 1962, Ser. No. 187,086
6 Claims. (Cl. 24—73)

The present invention relates to spring clips and more particularly to spring clips for ground glass tubing joints.

In glass apparatus for containing fluids, commonly found in hospitals and laboratories, the ground glass joint, which is composed of a male connector having an external ground glass surface which engages an interior ground glass surface of a female connector, is in general use. Since the two connectors merely slide together to form a joint, only a small amount of vibration or direct force is required to cause a separation. In order to prevent such separation, spring clips, which engage projections on both the male and female connectors, have been frequently utilized. Most of these spring clips have been found to be satisfactory whenever they have been utilized on the particular ground glass joint for which they were specifically designed. Although glass tubing is in itself well standardized, it has been found that the external diameters of ground glass joints made by different manufacturers and in different laboratories may vary to such an extent that when a spring clip that is not specifically designed for it is placed thereon, the ability of the clip to hold the connectors together is greatly reduced. The present invention overcomes this difficulty by providing a structure which will provide the same amount of holding force and engagement with the projections on the connectors regardless of the individual manufacturer's variation in the external diameters of the ground glass joints for any given size of connecting tubing.

It is, therefore, an object of the present invention to provide a new and improved spring clip for ground glass tubing joints.

A further object is to provide a spring clip composed of straight sections which are positioned at acute angles to each other.

An additional object is to provide a spring clip having a loop in each end which bears against projections in a male connector of a ground glass joint.

Another object is to provide a spring clip having straight end sections which are in a plane perpendicular to a centerline of a ground glass tubing joint when the clip is affixed thereto and bearing against projections on the male connector.

Further objects and advantages will become apparent from the following detailed description taken in connection with the accompanying drawings, in which:

FIG. 1 is a side elevational view of an embodiment of the present invention;

FIG. 2 is an end elevational view of the embodiment of the invention shown in FIG. 1;

FIG. 3 is a perspective view of the embodiment of the invention shown in FIG. 1;

FIG. 4 is a side elevational view of the embodiment of the invention shown in FIG. 1 with the embodiment removed from a ground glass tubing joint; and FIG. 5 is a side elevational view of another embodiment of the present invention.

While this invention is susceptible of embodiment in many different forms, there are shown in the drawings and will herein be described in detail two embodiments of the invention with the understanding that the present disclosure is to be considered as an exemplification of the principles of the invention and it is not intended to limit the invention to the embodiments illustrated. The scope of the invention will be pointed out in the appended claims.

Referring to FIGS. 1 and 2, a spring clip in accordance with the present invention generally indicated at 10 is holding a male ground glass connector 11 on the end of the glass tube 12 into a female ground glass connector 13 on the end of a glass tube 14. FIG. 4 illustrates the appearance of these elements prior to the assembly of the joint and prior to securing it with the spring clip 10. The male connector 11 has a projection in the form of a ridge 15 extending beyond the external surface of the tube 12 and the female connector 13 has projections or external lips 16 which are forced toward each other by the pressure applied by the spring clip 10 to maintain a fluid-tight joint between the connectors 11 and 13.

Referring now to FIG. 3 in addition to FIGS. 1, 2 and 4, the spring clip 10 is a resilient wire which has been formed into a series of straight sections 20–28 wherein each straight section makes acute angles with its adjoining sections. A center section 20 is adjoined by sections 21 and 22 which make slightly less than right angles with the section 20 and lie substantially in a common plane with section 20. A second pair of straight sections 23 and 24 adjoin sections 21 and 22 respectively at approximately 40° angles to the sections 21 and 22 respectively. A third pair of straight sections 25 and 26 adjoin the straight sections 23 and 24 respectively at slightly less than right angles and cross each other. A fourth pair of straight sections 27 and 28 adjoin the sections 25 and 27 respectively at slightly less than right angles. A pair of loops 29 and 30 are formed in the ends of the straight sections 27 and 28 respectively.

FIG. 4 more clearly illustrates the structure of the male connector 11 and its projection beyond the surface of the tube 12 in the form of a ridge 15. The ground glass male connector 11 slides into the female ground glass connector 13 and the clip 10 is forced onto the connector 13. Since the straight sections 21 and 22 form acute angles with the section 20, they and their adjoining straight sections 23 and 24 are forced inwardly against the outer surface of the connector 13 to thereby securely hold the clip on the glass connector. Forcing the clip onto the connector 13 spreads the sections 23 and 24 as shown in FIG. 2 to force the sections 27 and 28 tightly against the outer surface of the tube 12. The loop portions 29 and 30 are thereby forced down against the projection 15 to apply force against the male connector which tends to push it into the female connector. The amount of force exerted by the loops 29 and 30 against the projection 15 is greatly enhanced by the fact that the straight sections 23 and 24 bear against the projection 16 of a connector 13.

Although spring clips in the past have been used to hold ground glass joints together, these clips were usually formed in arcs, rather than straight sections, which closely surrounded the ground glass joints and the glass tubing. Since the outer diameters of the glass tubing and the ground glass female connectors usually varied between manufacturers, a clip made for a particular size joint of a particular manufacturer would not adequately secure the same size joint produced by another manufacturer for, if the outside diameter were slightly smaller than the outside diameter from which a clip was made, the clip could not adequately grasp either the external diameter of the connector or of the tube. On the other hand, if these outer diameters were slightly larger, forcing the clip on the tube would so spread the circular arcs apart that again an adequate grasp on the tube and on a female connector could not be maintained. As illustrated in the drawings, the present invention has overcome these difficulties by having the sections 21 and 22 pointed inwardly toward each other to form a three-point contact with section 20 on the external surface of the connector 13 which may be accomplished regardless of variations in the outer diameter of the connector 13. If the diameter is slightly greater, contact is made farther out along the straight sections 21 and 22 from the section 20 and if the diameter is smaller, contact is made closer to the section 20. However, since this is a three-point contact rather than an arc contact, which must be carefully sized to the outer diameter, such variations of the outer diameter of the joints of different manufacturers do not reduce the grasping ability of the present invention as they have previous spring clips. In addition, it will be noted from FIG. 2 that unlike the previous arcuate spring clips, the contact points of the U formed by the straight sections 21, 20 and 22 afford contact over more than 180° of a joint circumference, thereby applying pressure on the circumference of a joint at three points which are over 90° from each other. A similar situation exists for the U's formed by sections 23, 25 and 27 and sections 24, 26 and 28. Thus, the present construction provides three U-shaped portions formed into a continuous wire spring clip, each U-shaped portion being individually capable of holding the spring clip onto the glass joint. This triple "U" grasping feature assures that the clip cannot easily be forced off the joint by twisting of the tubes or rubbing against other apparatus. This overcomes a disadvantage which has been inherent in presently used spring clips.

Another embodiment of my spring clip is indicated generally at 100 in FIG. 5. Similar elements in this embodiment bear corresponding numerals to the elements of the first embodiment. This second embodiment differs from the first embodiment only in that the length of the straight sections 127 and 128 exceed in length the diameter of the ground glass joint and have loops formed at their ends 129 and 130 which lie in planes perpendicular to the centerline of the joint and the tubes 112 and 114 rather than in planes parallel to the centerline of the joint and the tubes as does the first embodiment of my invention. Loops 129 and 130 have radii greater than the radius of the wire itself to form a contact surface which spreads the clip easily when the clip is first applied. Instead of having loop portions 129 and 130 contact the projection 15 to force the connector 11 toward the connector 13, the straight sections 127 and 128 lie in a plane which is parallel to the projection 15 so that the contact area between these straight sections is slightly greater than the contact area afforded by the loops 29 and 30 in the first embodiment. Therefore, the second embodiment is preferable in those applications in which the projection 15 is very small and a greater contact area is desired from the clip. However, in cases where the contact area with the projection 15 is not critical but it is desired to utilize a clip which will not protrude unduly beyond the external surface of a joint, the first embodiment of the spring clip may be utilized. Therefore, each embodiment illustrated has a certain advantage in particular applications.

I claim:
1. A spring clip for ground glass tubing joints comprising two U-shaped wire portions having straight sides adapted to engage projections of a tubing joint and straight bottoms, said bottoms normally crossing each other, and a third U-shaped wire portion joining the two portions to form a continuous wire, said third U-shaped wire portion lying in a plane which forms substantial angles with said two U-shaped wire portions.

2. A spring clip for ground glass tubing joints comprising a resilient wire having:
   a straight center section slightly longer than the outer diameter of a ground glass tubing joint,
   a first pair of straight sections, each of which adjoins opposite ends of said center section and forms an acute angle therewith, said first pair of straight sections lying substantially in a plane with said center section,
   a second pair of straight sections, each of which adjoins an end, opposite to the center section, of one of said first pair and forms an acute angle therewith, in a plane which is substantially parallel to a centerline of a ground glass tubing joint whenever the clip is affixed to a tubing joint,
   a third pair of straight sections, each of which adjoins an end, opposite to one section of said first pair, of one section of said second pair and forms an acute angle therewith, said third pair of straight sections crossing each other, and
   a fourth pair of straight sections adapted to engage a projection on a male connector of a ground glass tubing joint, each of which adjoins an end, opposite to one section of said second pair, of one section of said third pair and forms an acute angle with the adjoining section.

3. A spring clip for ground glass tubing joints as specified in claim 2, wherein a loop is formed in each end of said wire.

4. A spring clip for ground glass tubing joints comprising a resilient wire having:
   a straight center section slightly longer than the outer diameter of a ground glass tubing joint,
   a first pair of straight sections, each of which adjoins opposite ends of said center section and forms an acute angle therewith, said first pair of straight sections lying substantially in a single plane with said center section,
   a second pair of straight sections, each of which adjoins an end, opposite to the center section, of one of said first pair and forms an acute angle therewith, in a plane which is substantially parallel to a centerline of a ground glass tubing joint whenever the clip is affixed to a tubing joint,
   a third pair of straight sections, each of which adjoins an end, opposite to one section of said first pair, of one section of said second pair and forms an acute angle therewith, said third pair of straight sections crossing each other,
   a fourth pair of straight sections, each of which adjoins an end, opposite to one section of said second pair, of one section of said third pair and forms an acute angle with the adjoining section, and
   a pair of loops adapted to engage a projection on a male connector of a ground glass joint, each of which is formed at an end, opposite to one section of said third pair, of one section of said fourth pair.

5. A spring clip for ground glass tubing joints comprising a single resilient wire having four substantially straight sections approximately parallel to each other, two of said sections adapted to engage an abutment of a male ground glass tubing connector on opposite sides of said male connector and the other two of said sections adapted to engage an abutment of a female ground glass tubing connector on opposing sides of said female connector, having an intermediate section interposed between one of said two straight sections which are adapted to engage a male connector and one of said two straight sections which are adapted to engage a female connector, and having another intermediate section interposed between the other of said two straight sections which are adapted to engage a male connector and the other of said two straight sections which are adapted to engage a female connector, said intermediate sections being at least as long as one of said four straight sections.

6. A spring clip for ground glass tubing joints comprising a single resilient wire having four substantially straight sections approximately parallel to each other, two of said sections being adapted to engage an abutment of a male ground glass tubing connector on opposite sides of said connector and the other two of said sections being adapted to engage an abutment of a female ground glass connector on opposite sides of said female glass connector, said four straight sections being joined by three alternating interposed sections, the outermost two of said interposed sections crossing each other.

References Cited in the file of this patent

UNITED STATES PATENTS

| | | |
|---|---|---|
| 735,566 | McGill | Aug. 4, 1903 |
| 888,663 | Sherwin | May 26, 1908 |
| 1,326,887 | Wood | Dec. 30, 1919 |
| 1,436,882 | Knepper | Nov. 28, 1922 |
| 2,134,858 | Clark | Nov. 1, 1938 |
| 2,192,165 | Caldwell | Feb. 27, 1940 |
| 2,957,218 | Sponsel | Oct. 25, 1960 |

FOREIGN PATENTS

| | | |
|---|---|---|
| 709,353 | Great Britain | May 19, 1954 |
| 719,536 | Great Britain | Dec. 1, 1954 |
| 676,457 | France | Nov. 28, 1929 |